United States Patent [19]

McDonald et al.

[11] Patent Number: 5,361,890
[45] Date of Patent: Nov. 8, 1994

[54] CONVEYOR TROLLEY ASSEMBLY

[75] Inventors: Clayton C. McDonald, Howell; Wendell H. Johnson, West Bloomfield, both of Mich.

[73] Assignee: Jarvis B. Webb Company, Farmington Hills, Mich.

[21] Appl. No.: 74,716

[22] Filed: Jun. 9, 1993

Related U.S. Application Data

[63] Continuation of Ser. No. 988,463, Dec. 10, 1992, abandoned.

[51] Int. Cl.$^5$ ............................................. B65G 29/00
[52] U.S. Cl. ............................. 198/465.4; 198/687.1; 198/678.1; 104/95
[58] Field of Search ................ 198/465.4, 678.1, 687.1, 198/687; 104/172.4, 95, 93, 89

[56] References Cited

U.S. PATENT DOCUMENTS

| | | | |
|---|---|---|---|
| 1,420,112 | 6/1922 | Krump | 104/107 |
| 2,281,794 | 5/1942 | Peebles | 105/152 |
| 2,830,694 | 4/1958 | Zebarth | 198/687 |
| 3,091,191 | 5/1963 | Fur | 104/172.4 |
| 3,927,760 | 12/1975 | McCall | 198/687.1 |
| 4,148,261 | 4/1979 | Wakabayashi | 104/172.4 |
| 4,210,238 | 7/1980 | Frost et al. | 104/95 X |

Primary Examiner—Cheryl L. Gastineau
Attorney, Agent, or Firm—Joseph W. Farley

[57] ABSTRACT

A conveyor trolley assembly comprises a molded plastic one-piece trolley body having a yoke defined by a base portion and a pair of arms extending symmetrically therefrom to a pair of transversely spaced extremities. The yoke and pair of arms are formed as a beam having inner and outer flanges connected by a pair of hubs adjacent to the arm extremities and by a web joined to the flanges and hubs. A pair of trolley wheels is mounted on the pair of hubs. An integrally formed load supporting stem extends from the base portion of the yoke oppositely to and intermediate the pair of arms. The stem has a pair of transversely spaced shoulders, and a pair of sides projecting from the shoulders are adapted to extend through a conveyor chain center link mounted on the stem in abutment with the shoulders. An molded plastic attachment bracket for retaining the center link on the stem and attaching a load to the trolley has a pair of stem engaging portions provided with projections fitting in recesses in the sides of the stem and transmitting load supporting forces thereto. A transverse bolt extending through the bracket and stem maintains the projections in engagement with the recesses. The attachment bracket may be formed by a pair of half-brackets, or by a one-piece bracket which can be snapped into engagement with the stem.

10 Claims, 3 Drawing Sheets

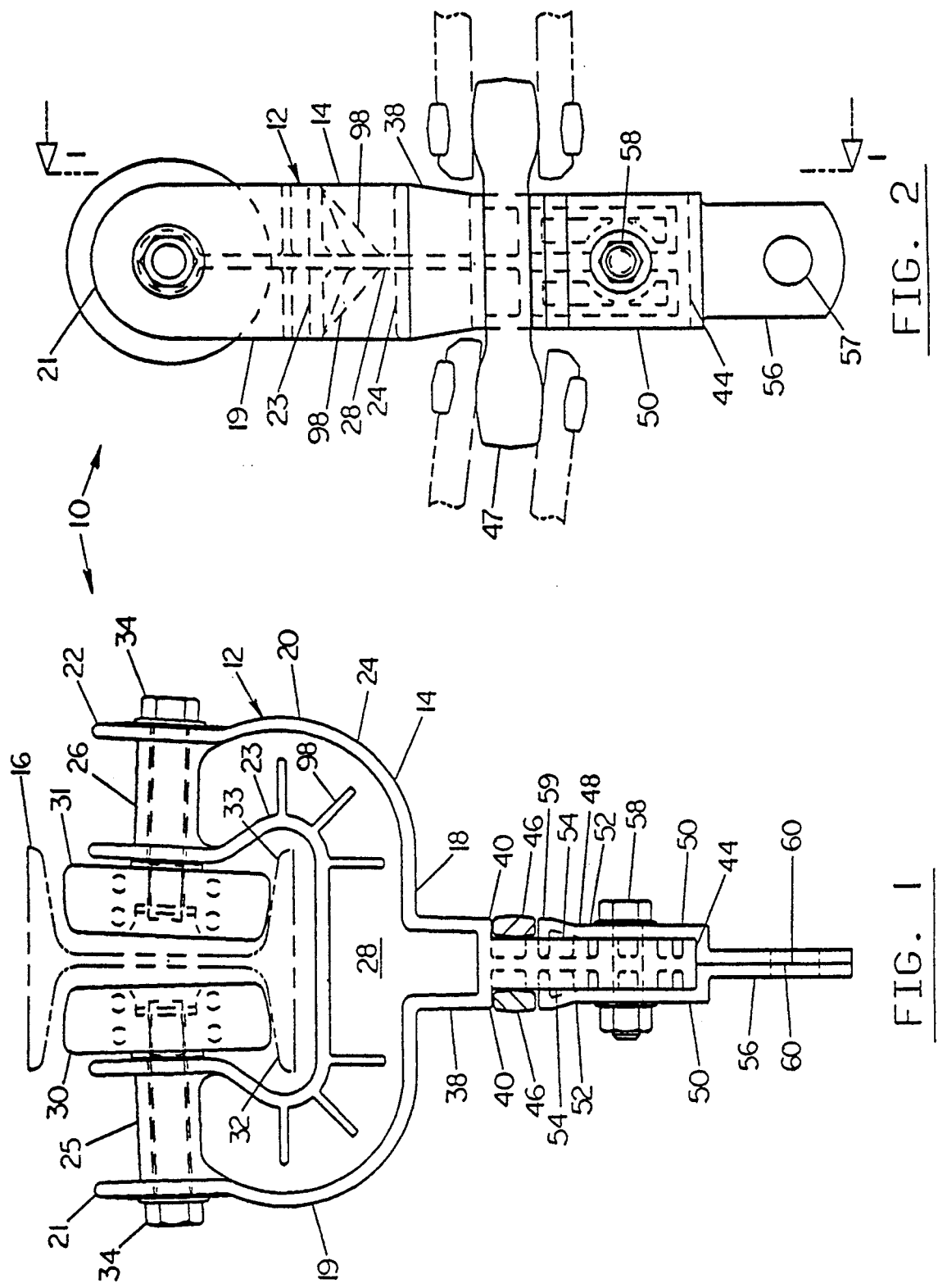

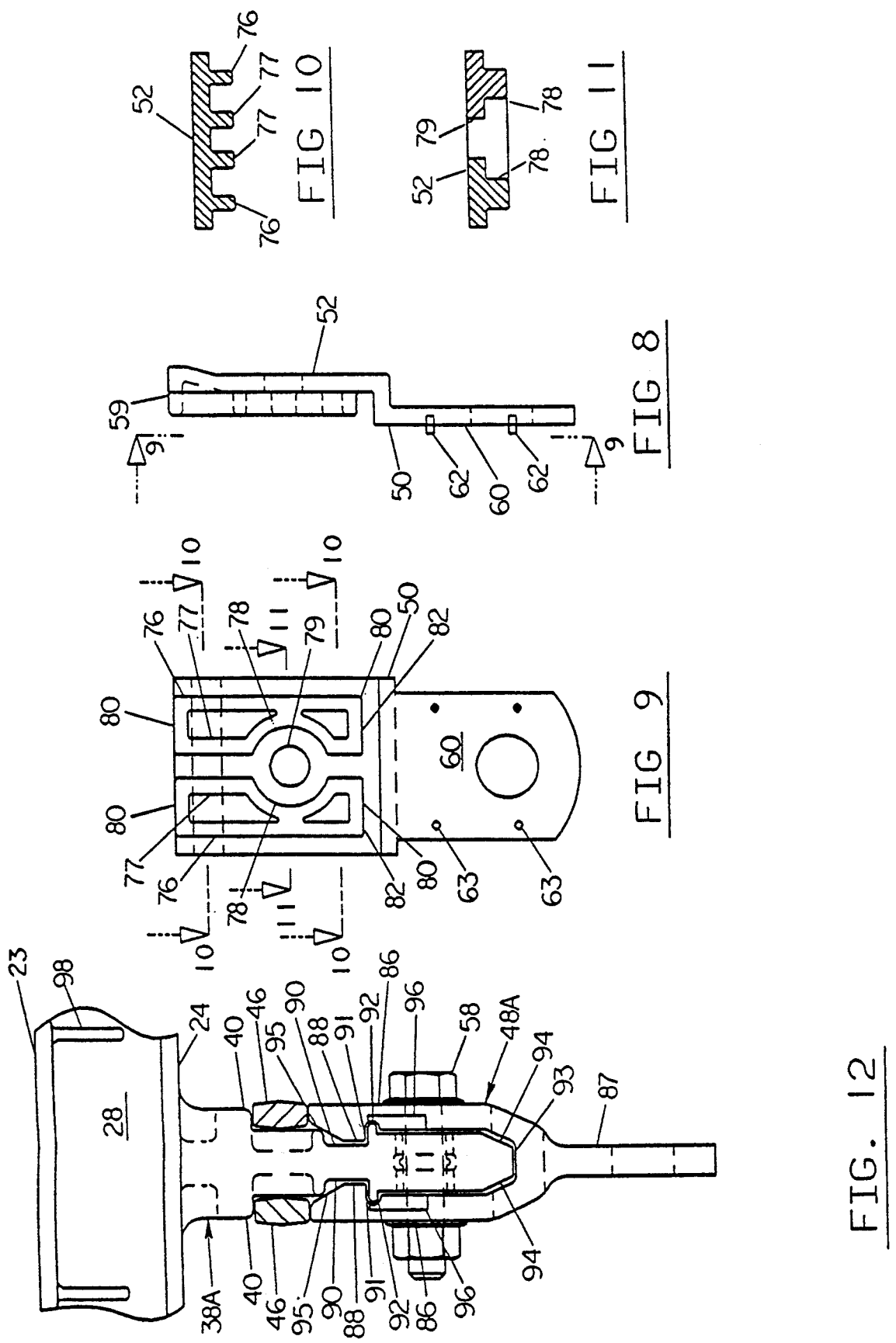

CONVEYOR TROLLEY ASSEMBLY

This is a continuation of copending application Ser. No. 07/988,463 filed on Dec. 10, 1990, abandoned.

This invention relates to improvements in a conveyor trolley assembly, consisting of a trolley body and an attachment which secures a conveyor chain center link to the assembly and enables a load to be supported thereby. The invention is particularly directed to improvements which enable the trolley assembly to be economically molded from a suitable plastic material and to possess the structural integrity required for given operational conditions.

Prior attempts to provide a commercially acceptable molded plastic conveyor trolley assembly have employed modified forms of conventional forged, cast or stamped metal components and have met with limited success. This is believed to result from a failure to provide structural characteristics for the components of the trolley assembly such that these components can be satisfactorily molded from plastic and have the resistance to failure necessary for commercial acceptance.

A conveyor trolley assembly of the present invention comprises a molded one-piece trolley body including a yoke adapted to be positioned transversely of a longitudinally extending conveyor track. The yoke is defined by a base portion and a pair of arms extending symmetrically therefrom to a pair of transversely spaced extremities, the base portion and pair of arms being formed by continuous transversely spaced inner and outer flanges extending from the extremity of one arm to the extremity of the other arm, by a pair of hubs connecting the inner and outer flanges adjacent to the arm extremities, and by a transverse web joined to the inner and outer flanges and to the pair of hubs. A pair of trolley wheels is connected to the pair of hubs in transversely spaced facing relation and is adapted to engage a pair of transversely spaced track surfaces of the conveyor track.

The trolley body also includes a load supporting stem formed integrally with the yoke and extending from the base portion thereof oppositely to and intermediate the pair of arms. The stem has a pair of transversely spaced longitudinally extending shoulders and a pair of transversely spaced longitudinally extending sides projecting from the shoulders. These sides of the stem are adapted to extend through a conveyor chain center link mounted on the stem in abutment with the shoulders.

An attachment bracket for retaining the conveyor chain center link on the stem and for attaching a load to the trolley has a pair of transversely spaced stem engaging portions positionable in engagement with the sides of the stem and a load supporting portion depending from the stem engaging portions. Interfitting projections and recesses, provided on the stem engaging portions of the bracket and on the sides of the stem, are maintained in engagement by connector means extending transversely therethrough and are arranged to transmit load supporting forces from the attachment bracket to the stem.

In one embodiment of the invention, the attachment bracket comprises a pair of brackets each having one of the pair of stem engaging portions and a load supporting half-portion, the load supporting half-portions having opposed, abuttingly engageable faces. The recesses extend inwardly from each side of the stem and are defined by a longitudinal partition intermediate the sides and by reinforcing webs extending horizontally and reinforcing webs extending vertically between the sides. At least one of the horizontally extending webs has an upwardly directed load supporting face. Preferably, the vertically extending reinforcing webs include a pair of longitudinally spaced end webs and a central web intermediate the end webs, the central web being provided with a circular boss with an aperture therein for receiving the connector means. The horizontally extending webs connect the upper and lower ends of the vertical webs.

In this embodiment of the invention, the projections extend outwardly of the stem engaging portion of each of the pair of brackets and include at least one downwardly directed load transmitting face engageable with the upwardly directed load supporting face. Preferably, the projections are formed by horizontal and vertical ribs, the vertical ribs including a pair of end ribs and a pair of central ribs all having upper and lower ends, the horizontal ribs connecting the upper and lower ends of each end rib with the upper and lower ends of an adjacent one of the central ribs. The central ribs have opposed arcuate segments forming a socket portion, and an opening is formed through the stem engaging portion of each bracket concentrically with the socket portion. The end ribs fit within the end webs of the stem, the central ribs straddle the stem central web with its circular boss received in the socket portion, and the horizontal ribs fit within the horizontal webs. The connector means comprises a fastener inserted through the opening in each of the brackets and the aperture in the stem, and the lower horizontal ribs and webs respectively include interengaging downwardly and upwardly directed surfaces arranged to transmit load supporting forces from the brackets to the stem, thereby relieving the fastener from such forces.

In an alternative embodiment of the invention, the attachment bracket comprises a molded one-piece bracket having a transversely spaced pair of stem engaging portions branching from a common load supporting portion. A pair of mutually facing projections on the stem engaging portions engage a pair of oppositely facing recesses in the sides of the stem, and these projections and recesses respectively have a pair of downwardly directed load transmitting surfaces and a pair of upwardly directed load supporting surfaces. Preferably, the stem has a terminal end provided with a pair of converging side surfaces, and the pair of stem engaging portions terminate in a pair of diverging wedge surfaces extending from the mutually facing projections. The wedge surfaces are complimentary to the converging side surfaces and are engageable therewith for assembly of the bracket on the stem, the stem engaging portions of the bracket being resiliently moveable transversely in response to such engagement so that relative endwise movement between the bracket and stem enables the projections to be interfitted in the recesses.

The characteristics of the trolley assembly of the invention summarized above enable the trolley body and attachment bracket components of the assembly to be economically molded from a suitable plastic material, such as Delrin 100 manufactured by E. I. DuPont de Nemours & Co., Inc., and to have the properties required for successful commercial use.

Other features and advantages of the invention will appear from the description to follow of the embodiments thereof shown in the accompanying drawings.

DESCRIPTION OF THE DRAWINGS

FIG. 1 is a transverse elevation of a conveyor trolley assembly of the invention, taken as indicated by the line 1—1 of FIG. 2;

FIG. 2 is a side elevation of the conveyor trolley assembly of FIG. 1;

FIG. 8 is a transverse elevation of an attachment bracket of the conveyor trolley assembly of FIG. 1;

FIG. 9 is a side elevation of the attachment bracket of FIG. 8, taken as indicated by the arrows 9—9 thereof;

FIG. 10 is a sectional plan view taken on the lines 10—10 of FIG. 9;

FIG. 11 is a sectional plan view taken on the line 11—11 of FIG. 9; and

FIG. 12 is a fragmentary transverse elevation showing a modified construction of the conveyor trolley stem portion and attachment bracket.

DETAILED DESCRIPTION

Figure 5:
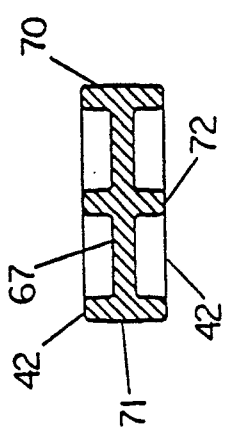
FIGS. 5, 6 and 7 are sectional plan views taken respectively on the lines 5—5, 6—6 and 7—7 of FIG. 4.
Figure 6:
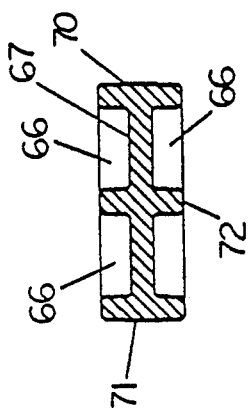
Figure 7:
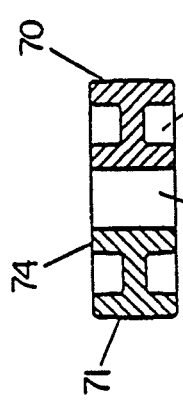

The trolley assembly 10 of the invention shown in FIGS. 1 and 2 comprises a molded one-piece trolley body 12 including a yoke 14 adapted to be positioned transversely of a longitudinally extending conveyor track 16. The yoke 14 is defined by a base portion 18 and by a pair of arms 19 and 20 which extend symmetrically from the base portion 18 outwardly and converge inwardly to a pair of substantially parallel extremities 21 and 22. Continuous transversely spaced inner and outer flanges 23 and 24 extend from the extremity 21 of one arm 19 to the extremity 22 of the other arm 20, and these flanges 23 and 24 are connected by a pair of hubs 25 and 26 adjacent the extremities 21 and 22 and by a transverse web 28 joined to the flanges 23 and 24 and to the hubs 25 and 26.

A pair of trolley wheels 30 and 31 is connected to the pair of hubs 25 and 26 in transversely spaced facing relation so that the pair of wheels is adapted to engage a pair of transversely spaced track surfaces 32 and 33 of the track 16, the connection of each wheel to a hub being made by suitable means such as an axle bolt 34.

Figure 4:
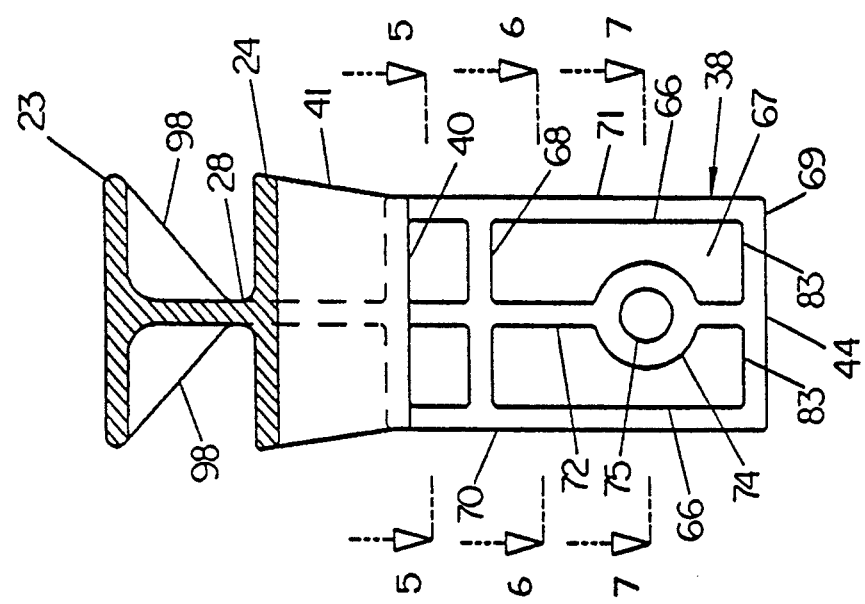
FIG. 4 is a side elevation taken as indicated by the line 4—4 of FIG. 3.
Figure 3:
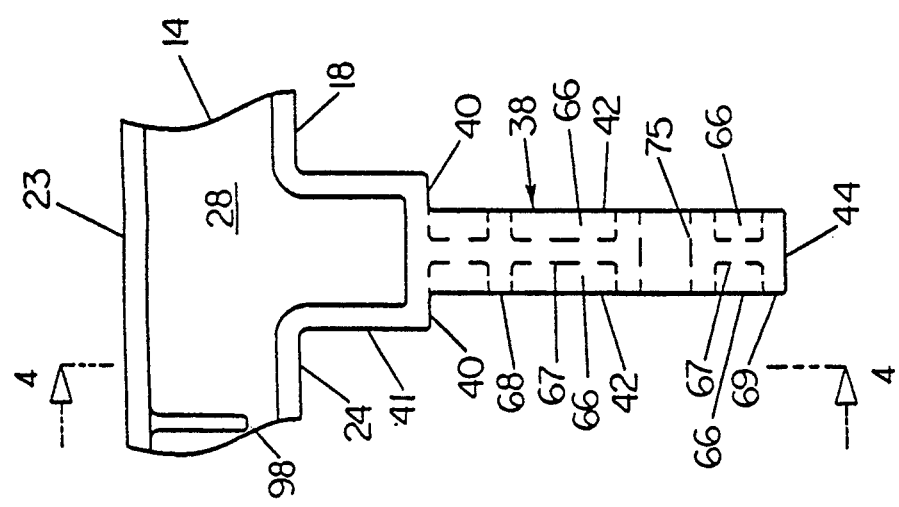
FIG. 3 is an enlarged fragmentary transverse elevation of the lower, or stem portion, of the conveyor trolley of FIG. 1.

A load supporting stem 38 (FIGS. 3 and 4) is formed integrally with the yoke 14 and extends from the base portion 18 thereof oppositely to and intermediate the pair of arms 19 and 20. The stem 38 has a pair of transversely spaced, longitudinally extending shoulders 40 formed by an extension 41 of the outer flange 24 from the base portion 18 of the yoke 14 medially of the pair of arms 19 and 20. The stem 38 also has a pair of transversely spaced, longitudinally extending sides 42 which project from the shoulders 40 to a terminal end 44. These sides 42 are adapted to extend through the sides 46 of a conveyor chain center link 47 mounted on the stem 38 in abutting relation with the shoulders 40, as shown in FIGS. 1 and 2.

An attachment bracket 48 mounted on the stem 38 retains the center link 47 thereon and permits a load to be supported by the trolley assembly 10. This attachment bracket 48 in FIGS. 1 and 2 is formed by a pair of brackets 50 providing a pair of transversely spaced stem engaging portions 52 having faces 54 positionable in engagement with the sides 42 of the stem 38 and having a load supporting portion 56 depending from the stem engaging portions, and provided with a load connection hole 57. Interfitting projections and recesses provided on the faces 54 of the stem engaging portions 52 and on the sides 42 of the stem 38 as described below, transmit load supporting forces from the attachment bracket 48 to the stem 38. A connecting fastener 58 extends transversely through the stem engaging portions 52 and the stem 38 for maintaining engagement between the interfitting projections and recesses.

One of the brackets 50 is shown in detail in FIGS. 8-11; the stem 38 is shown in detail in FIGS. 3-7.

Each bracket 50 has one of the stem engaging portions 52 provided with a transversely widened upper end 59 for supporting a side 46 of the center link 47 (FIG. 1); and, has a transversely offset load supporting half-portion with a face 60 abuttingly engageable with the corresponding face of the other bracket 50 of the pair, as shown in FIG. 1. Locating pins 62 and holes 63 provided on each bracket 50 are interengageable when the faces 60 of the pair of brackets 50 are properly placed in abutment.

The stem 38 (FIGS. 3-7) has recesses 66 which extend inwardly from each of its sides 42 and which are defined by a partition 67 centered transversely between the sides 42 and by upper and lower horizontal reinforcing webs 68 and 69 connecting vertical reinforcing webs which include longitudinally spaced end webs 70 and 71 and a central web 72. A circular boss 74 having an aperture 75 for receiving the fastener 58 is provided on the central web.

The stem engaging portion 52 of each bracket 50 has projections defined by transversely projecting horizontal and vertical ribs (FIGS. 8-11), the vertical ribs including a pair of end ribs 76 and a pair of central ribs 77 having opposed arcuate segments 78 forming a socket portion provided with a concentric opening 79 for receiving the fastener 58. Horizontal ribs 80 connect the upper and lower ends of each end rib 76 with the upper and lower ends of the adjacent one of the central ribs 77.

By comparing the bracket 50 of FIGS. 8-11 with the stem 38 of FIGS. 3-7, it is apparent that the end ribs 76 of each bracket are fittable within the end webs 70 and 71 of the stem; that the central ribs 77 of the bracket are adapted to straddle the central web 72 of the stem with the circular boss 74 received in the socket portion formed by the arcuate segments 78 of the central ribs; and, that the horizontal ribs 80 of the bracket are fittable within the upper and lower horizontal webs 68 and 69 of the stem. When the ribs of the brackets 50 are thus interfitted within the webs of the stem 38, the fastening bolt 58 is insertable through the opening 79 in each of the brackets and the aperture 75 in the stem. Preferably, the bolt 58 serves only to maintain engagement between the interfitting ribs and webs which are designed so that the downwardly directed surfaces 82 of the lower horizontal ribs 80 of the brackets 50 interengage the upwardly directed surfaces 83 of the lower horizontal web 69 of the stem to transmit load supporting forces from the brackets to the stem. This relieves the fastener 58 from such load supporting forces and prevents their concentration in the relatively small surface areas of the brackets and stem through which such forces could be transmitted by the fastener. The transmission of load supporting forces can be augmented by interengagement between downwardly directed portions of the arcuate segments 78 of the central ribs 77 of the brackets and the upwardly directed portions of the boss 74 on the central web 72 of the stem.

FIG. 12 shows an alternative molded construction of an integral trolley body stem 38A and attachment 48A. The attachment 48A is a molded one-piece bracket having a pair of transversely spaced stem engaging portions 86 branching from a common load supporting portion 87. The interfitting projection and recess means comprises a pair of mutually facing projections 88 on the stem engaging portions 86 and a pair of oppositely facing recesses 90 in the sides of the stem. These projections 88 and recesses 90 respectively have a pair of downwardly directed load transmitting surfaces 91 and a pair of upwardly directed load supporting surfaces 92 for relieving the fastener 58 of load supporting forces, as described above.

The stem 38A has a terminal end 93 provided with a pair of converging side surfaces 94. The pair of stem engaging portions 86 terminate in a pair of diverging wedge surfaces 95 which extend from the mutually facing projections 88. The stem engaging portions 86 are constructed, as by the provision of recesses 96 below the projections 88, so as to be resiliently moveable transversely by engagement of the wedge surfaces 95 with the converging side surfaces 94 in response to relative endwise movement between the attachment bracket 48A and the stem 38A. Interfitting engagement of the projections 88 in the recesses 90 can thereby be accomplished.

The invention provides a conveyor trolley assembly which can be molded economically from a suitable plastic material and which can be readily adapted to meet design parameters imposed by the physical properties of the plastic material and by the load conditions and forces present in a particular commercial application. The yoke 14 of the trolley body 12 is a beam of I, or H-on-edge section, formed by the integral inner and outer flanges 23 and 24 and by the connecting web 28 including the pair of hubs 25, 26. This beam prevents buckling of the trolley body under load. Compression stress is resisted by the outer flange 24, tensile stress is resisted by the inner flange 23, and the flanges can each be proportioned accordingly. Torsional rigidity of the trolley body is provided by the connecting web structure which can be supplemented by reinforcing gussets 98 (FIGS. 1-4). Alternatively, the web structure can be made non-planar for greater torsional rigidity.

The integral stem 38 or 38A of the trolley body 12 has a transverse width such as to fully occupy the space available between the sides 46 of a conveyor chain center link 47. As previously described, load supporting forces are transmitted from the attachment 48 or 48A to the stem 38 or 38A by interengaging surfaces thereof, and not through the fastener 58, to prevent undue stress concentrations in the plastic material resulting from these forces.

We claim:

1. A conveyor trolley assembly comprising:
    a molded one-piece trolley body including a yoke adapted to be positioned transversely of a longitudinally extending conveyor track, said yoke being defined by a base portion and a pair of arms extending symmetrically from said base portion to a pair of transversely spaced extremities, said base portion and pair of arms having continuous transversely spaced inner and outer flanges extending from the extremity of one arm to the extremity of the other arm, a pair of hubs connecting said inner and outer flanges adjacent said pair of extremities, and a transverse web joined to said inner and outer flanges and to said pair of hubs;
    a pair of trolley wheels, and means for connecting said pair of trolley wheels to said pair of hubs in transversely spaced facing relation whereby said pair of wheels is adapted to engage a pair of transversely spaced track surfaces of said conveyor track;
    a load supporting stem formed integrally with said yoke and extending from said base portion oppositely to and intermediate said pair of arms, said stem having a pair of transversely spaced longitudinally extending shoulders and a pair of transversely spaced longitudinally extending sides projecting from said shoulders and adapted to extend through a conveyor chain center link mounted on said stem in abutment with said shoulders;
    attachment bracket means for retaining said conveyor chain center link on said stem and attaching a load to said trolley;
    said bracket means including a pair of transversely spaced stem engaging portions having faces positionable in engagement with said sides of said stem, a load supporting portion depending from said stem engaging portions;
    interfitting projection and recess means provided on said faces of said stem engaging portions and on said sides of said stem for transmitting load supporting forces from said attachment bracket means to said stem;
    and connector means extending transversely through said stem engaging portions and said stem for maintaining engagement between said interfitting projection and recess means.

2. A conveyor trolley assembly according to claim 1, wherein said attachment bracket means comprises a pair of brackets each having one of said pair of stem engaging portions and a load supporting half-portion transversely offset therefrom, the load supporting half portions of said pair of brackets having opposed abuttingly engageable faces.

3. A conveyor trolley assembly according to claim 2, wherein said interfitting projection and recess means comprise recess means extending inwardly from each of said sides of said stem, said recess means being defined by a longitudinal partition intermediate said sides and by transverse reinforcing webs extending horizontally and reinforcing webs extending vertically between said sides, at least one of said horizontally extending reinforcing webs having an upwardly directed load supporting face;
    and projection means extending outwardly of said stem engaging portion of each of said brackets, said projection means including at least one downwardly directed load transmitting face engageable with said upwardly directed load supporting face.

4. A conveyor trolley assembly according to claim 3, wherein said vertically extending reinforcing webs include a pair of longitudinally spaced end webs and a central web intermediate said end webs, said central web being provided with a circular boss, and an aperture in said circular boss for receiving said connector means.

5. A conveyor trolley assembly according to claim 4 wherein said projection means includes a socket portion adapted to receive said circular boss, and a connector means receiving opening formed through the stem engaging portion of each of said brackets concentrically with said socket portion.

6. A conveyor trolley assembly according to claim 4, wherein said projection means is defined by horizontal and vertical ribs projecting transversely from said stem engaging portion of each of said brackets, said vertical ribs including a pair of end ribs and a pair of central ribs, said end ribs and said central ribs having upper and lower ends, said horizontal ribs connecting the upper and lower ends of each of said end ribs with the upper and lower ends of an adjacent one of said central ribs, said central ribs having opposed arcuate segments forming a socket portion, said end ribs being fittable within said end webs, said central ribs being adapted to straddle said central web with said circular boss received in said socket portion, and said horizontal ribs being fittable within horizontal webs at upper and lower ends of said vertical end and central webs, an opening formed through the stem engaging portions of each of said brackets concentrically with said socket portion, said connector means comprising a fastener insertable through said opening in each of said brackets and said aperture in said stem, and said lower horizontal ribs and webs respectively include interengaging downwardly and upwardly directed surfaces arranged to transmit load supporting forces from said brackets to said stem whereby said fastener is relieved from such load supporting forces.

7. A conveyor trolley assembly according to claim 1 wherein said outer flange extends from said base portion of said yoke medially of said pair of arms and forms said pair of shoulders of said stem.

8. A conveyor trolley assembly according to claim 1 wherein said attachment bracket means comprises a molded one-piece bracket having a transversely spaced pair of stem engaging portions branching from a common load supporting portion, said interfitting projection and recess means comprises a pair of mutually facing projections on said stem engaging portions and a pair of oppositely facing recesses in said sides of said stem, said projections and recesses respectively having a pair of downwardly directed load transmitting surfaces and a pair of upwardly directed load supporting surfaces.

9. A conveyor trolley assembly according to claim 8 wherein said stem has a terminal end including a pair of converging side surfaces, and said pair of stem engaging portions terminate in a pair of diverging wedge surfaces complimentary to said converging side surfaces, said wedge surfaces extending from said mutually facing projections, said stem engaging portions of said bracket being resiliently moveable transversely by engagement of said wedge surfaces with said converging side surfaces in response to relative endwise movement between said bracket and said stem for interfitting said projections in said recesses.

10. A conveyor trolley assembly according to claim 1 wherein said trolley body and said attachment bracket means are each molded from a plastic material.

* * * * *

UNITED STATES PATENT AND TRADEMARK OFFICE
CERTIFICATE OF CORRECTION

PATENT NO. : 5,361,890

DATED : November 8, 1994

INVENTOR(S) : McDonald, et. al.

It is certified that error appears in the above-indentified patent and that said Letters Patent is hereby corrected as shown below:

Title page, item [73], Assignee: change "Jarvis B. Webb Company" to -- Jervis B. Webb Company--.

Signed and Sealed this

Twenty-eight Day of March, 1995

Attest:

BRUCE LEHMAN

Attesting Officer        Commissioner of Patents and Trademarks